US012702930B2

(12) United States Patent
Sun et al.

(10) Patent No.: US 12,702,930 B2
(45) Date of Patent: Aug. 11, 2026

(54) ROLE PICTURE GENERATION AND DISPLAYING METHOD, DEVICE, AND STORAGE MEDIUM

(71) Applicant: Lemon Inc., Grand Cayman (KY)

(72) Inventors: Chenyu Sun, Los Angeles, CA (US); Yunzhu Li, Los Angeles, CA (US); Zihan Wang, Beijing (CN); Bonong Bai, Beijing (CN); Hui Xu, Beijing (CN); Tao Xiong, Beijing (CN); Xuye Cai, Beijing (CN); Yehua Lyu, Beijing (CN)

(73) Assignee: Lemon Inc., Grand Cayman (KY)

( * ) Notice: Subject to any disclaimer, the term of this patent is extended or adjusted under 35 U.S.C. 154(b) by 230 days.

(21) Appl. No.: 18/570,065

(22) PCT Filed: Oct. 28, 2022

(86) PCT No.: PCT/SG2022/050776
§ 371 (c)(1),
(2) Date: Dec. 14, 2023

(87) PCT Pub. No.: WO2023/080843
PCT Pub. Date: May 11, 2023

(65) Prior Publication Data

US 2024/0278138 A1 Aug. 22, 2024

(30) Foreign Application Priority Data

Nov. 8, 2021 (CN) ......................... 202111313147.2

(51) Int. Cl.

| | |
|---|---|
| ***A63F 13/822*** | (2014.01) |
| ***A63F 13/213*** | (2014.01) |
| ***A63F 13/655*** | (2014.01) |

(52) U.S. Cl.
CPC .......... *A63F 13/822* (2014.09); *A63F 13/213* (2014.09); *A63F 13/655* (2014.09);
(Continued)

(58) Field of Classification Search
CPC .... A63F 13/213; A63F 13/5372; A63F 13/63; A63F 13/655; A63F 13/86; A63F 13/87;
(Continued)

(56) References Cited

U.S. PATENT DOCUMENTS

| | | | | |
|---|---|---|---|---|
| 11,417,053 B1 * | 8/2022 | Yang | ........................ | A63F 13/67 |
| 2009/0315893 A1 * | 12/2009 | Smith | ..................... | A63F 13/49 345/473 |

(Continued)

FOREIGN PATENT DOCUMENTS

| | | |
|---|---|---|
| CN | 109391792 A | 2/2019 |
| CN | 110035321 A | 7/2019 |

(Continued)

OTHER PUBLICATIONS

International Patent Application No. PCT/SG2022/050776; Int'l Search Report; dated Jul. 18, 2023; 3 pages.

(Continued)

*Primary Examiner* — Lawrence S Galka
(74) *Attorney, Agent, or Firm* — BakerHostetler

(57) ABSTRACT

Embodiments of the disclosure provide a role information method, a device, a storage medium, and a program product. The method includes: collecting a video picture, performing portrait recognition on the video picture, and obtaining portrait information of a user; acquiring an effect prop corresponding to a target role selected by the user and obtaining a first role picture of the user by loading an effect onto the portrait information according to the effect prop, and transmitting the first role picture to a server; and pulling at least one second role picture transmitted by another user (Continued)

from the server, synthesizing the second role picture and the first role picture, and pushing a synthesized picture to a display interface for displaying. The embodiment can provide more abundant information for the user, such that pleasure of a game can be enhanced, and user experience can be improved.

20 Claims, 10 Drawing Sheets

(52) U.S. Cl.
CPC ... *A63F 2300/1087* (2013.01); *A63F 2300/65* (2013.01); *A63F 2300/807* (2013.01)

(58) Field of Classification Search
CPC ............... G06V 40/165; G06V 40/166; H04N 2005/2726; H04N 21/4788
See application file for complete search history.

(56) References Cited

U.S. PATENT DOCUMENTS

2010/0009747 A1* 1/2010 Reville .................. A63F 13/30 463/31
2010/0026698 A1* 2/2010 Reville .................. A63F 13/45 345/581
2010/0035692 A1* 2/2010 Reville .................. A63F 13/85 463/43
2010/0045697 A1* 2/2010 Reville ................. G06F 3/0481 345/619
2010/0197396 A1* 8/2010 Fujii ...................... A63F 13/10 463/31
2013/0244784 A1* 9/2013 Assa ..................... G06F 3/0416 463/40
2017/0087473 A1* 3/2017 Siegel ................. G07F 17/3293
2019/0280943 A1* 9/2019 Kaw .................. H04L 41/0843
2020/0306640 A1* 10/2020 Kolen .................... G06N 3/094
2021/0291058 A1* 9/2021 Dura ..................... A63F 13/655
2022/0355188 A1* 11/2022 Tsuchiya ............... A63F 13/213

FOREIGN PATENT DOCUMENTS

CN 111760265 A 10/2020
WO WO 2019/139631 A1 7/2019

OTHER PUBLICATIONS

"Zoom Virtual Backgrounds"; https://webarchive.org/web/20211104105653/https://explore.zoom.us/en/virtual-backgrounds/; Zoom Video Communications Inc.; Nov. 2021; accessed Dec. 15, 2021; 3 pages.

* cited by examiner

ROLE PICTURE GENERATION AND DISPLAYING METHOD, DEVICE, AND STORAGE MEDIUM

CROSS-REFERENCE TO RELATED APPLICATION(S)

This application is a U.S. National Stage Application of PCT Application Serial No. PCT/SG2022/050776, filed on Oct. 28, 2022, which claims the priority to Chinese Patent Application No. 202111313147.2, filed on Nov. 8, 2021 and entitled "Method and Device for Role Information Interaction, Storage medium, and Program Product", the disclosures of which are incorporated herein by reference in their entireties.

FIELD

Embodiments of the disclosure relate to the technical field of communication, and particularly relate to a method and a device for role information interaction, a storage medium, and a program product.

BACKGROUND

Playing online games is a common way for people to relax and release stress. A variety of roles are possibly involved in games. The design of information interaction between different roles becomes an important factor influencing game quality and user experience.

In the prior art, information interaction between different roles in the game is generally conducted through voice or text.

However, since communication between roles is implemented only in a single form of voice or text in the above solution, rich content fails to be presented to the user, thus influencing pleasure of a game and leading to poor user experience.

SUMMARY

Embodiments of the disclosure provide a method and device for role information interaction, a storage medium, and a program product, so as to solve the problems that information interaction between different roles in an existing online game is conducted in a single form, rich content fails to be presented to a user, pleasure of a game is influenced, and user experience is poor.

In a first aspect, an embodiment of the disclosure provides a method for role information interaction. The method is applied to a terminal device and includes: collecting a video picture and performing portrait recognition on the video picture, to obtain portrait information of a user;

- acquiring an effect prop corresponding to a target role selected by the user and loading an effect onto the portrait information according to the effect prop to obtain a first role picture of the user, and transmitting the first role picture to a server; and
- pulling at least one second role picture transmitted by another user from the server, synthesizing the second role picture and the first role picture, and pushing a synthesized picture to a display interface for displaying.

In a second aspect, an embodiment of the disclosure provides a device for role information interaction. The device includes:

- a recognition module configured to collect a video picture and perform portrait recognition on the video picture to obtain portrait information of a user;
- a loading module configured to acquire an effect prop corresponding to a target role selected by the user and load an effect onto the portrait information according to the effect prop to obtain a first role picture of the user, and transmit the first role picture to a server; and
- a synthesizing and displaying module configured to pull at least one second role picture transmitted by another user from the server, synthesize the second role picture and the first role picture, and push a synthesized picture to a display interface for displaying.

In a third aspect, an embodiment of the disclosure provides an electronic device. The electronic device includes: a visual sensor, a processor, a memory, a display, and a transceiver.

The visual sensor, the processor, the memory, the display and the transceiver are interconnected to each other by a circuit.

The memory stores a computer-executable instruction. The visual sensor is configured to collect a video picture. The transceiver is configured to transmit data to and receive data from a server. The display is configured to display a synthesized picture.

The processor executes the computer-executable instruction stored in the memory, such that the processor executes the method for role information interaction according to the first aspect and various possible designs of the first aspect.

In a fourth aspect, an embodiment of the disclosure provides a computer-readable storage medium. The computer-readable storage medium stores a computer-executable instruction. A processor, when executing the computer-executable instruction, implements the method for role information interaction according to the first aspect and various possible designs of the first aspect.

In a fifth aspect, an embodiment of the disclosure provides a computer program product. The computer program product includes a computer program. The computer program implements the method for role information interaction according to the first aspect and various possible designs of the first aspect, when executed by a processor.

In a sixth aspect, an embodiment of the disclosure provides a computer program. The computer program implements the method for role information interaction according to the first aspect and various possible designs of the first aspect, when executed by a processor.

In the method and device for role information interaction, the storage medium and the program product according to the present embodiment, the method includes: collecting the video picture and performing portrait recognition on the video picture, to obtain the portrait information of the user; acquiring the effect prop corresponding to the target role selected by the user and loading an effect onto the portrait information according to the effect prop to obtain the first role picture of the user, and transmitting the first role picture to the server; and pulling the at least one second role picture transmitted by another user from the server, synthesizing the second role picture and the first role picture, and pushing the synthesized picture to the display interface for displaying.

BRIEF DESCRIPTION OF THE DRAWINGS

In order to more clearly describe technical solutions in embodiments of the disclosure or in the related art, the accompanying drawings required for description of the embodiments or the related art will be briefly introduced below. Apparently, the accompanying drawings in the following description are some embodiments of the disclosure. Those of ordinary skill in the art would also derive other accompanying drawings from these accompanying drawings without making inventive efforts.

DETAILED DESCRIPTION OF EMBODIMENTS

For making objectives, technical solutions and advantages of embodiments of the disclosure more clear, the technical solutions in the embodiments of the disclosure will be clearly and completely described below in conjunction with the accompanying drawings in the embodiments of the disclosure. Apparently, the described embodiments are some embodiments rather than all embodiments of the disclosure. Based on the embodiments of the disclosure, all other embodiments obtained by those of ordinary skill in the art without making creative efforts fall within the protection scope of the disclosure.

Playing online games is a common way for people to relax and release stress. A variety of roles are possibly involved in games. The design of information interaction between different roles becomes an important factor influencing game quality and user experience. In the related art, different roles generally conduct information interaction with each other in the game through voice or text. However, since communication between roles is implemented only in a single form of voice or text in the above solution, rich content fails to be presented to the user, thus influencing pleasure of a game and leading to poor user experience.

In order to solve the above technical problems, the inventor finds that all players may conduct information interaction by sharing video pictures, and may load an effect onto portraits in the pictures on the basis of roles, such that richness of information interaction is improved. In view of that, an embodiment of the disclosure provides a method for role information interaction. The method may enable the user to receive real-time video pictures of the other users, and also provide more abundant information for the user by loading an effect onto portrait information in a picture, such that pleasure of a game can be enhanced, and user experience can be improved. The real-time video pictures of the other users are received, and more abundant information is provided for the user by loading the effect onto the portrait information in the picture, such that the pleasure of a game can be enhanced, and the user experience can be improved.

Figure 1:
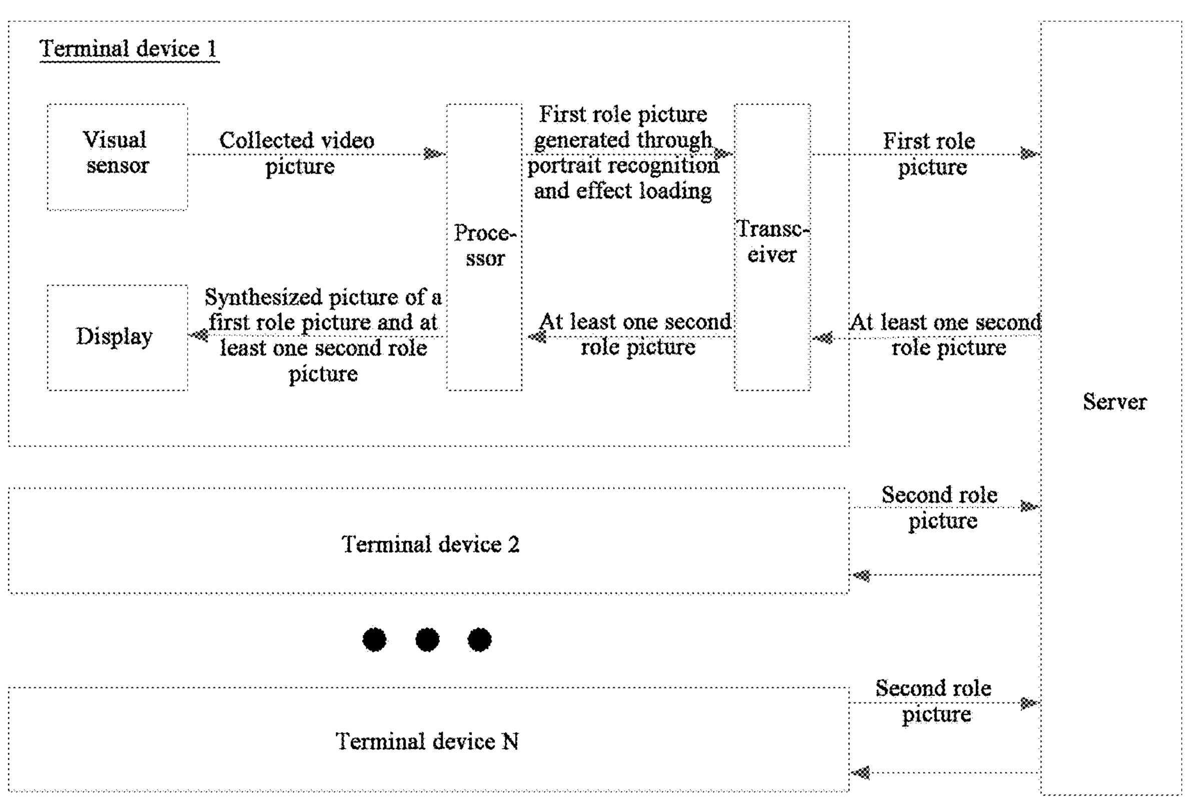
FIG. 1 is a schematic diagram of an application scene of a method for role information interaction according to an embodiment of the disclosure.

Reference is made to FIG. 1, which is a schematic diagram of an application scene of a method for role information interaction according to an embodiment of the disclosure. As shown in FIG. 1, terminal device 1, terminal device 2, . . . and terminal device N are in communication connection with a server in the application scene. The method for role information interaction is illustrated with the terminal device 1 as an example. The terminal device 1 may specifically include a visual sensor, a display, a processor, and a transceiver.

In a specific implementation process, assuming that a script includes N roles, each user corresponds to a role and a terminal device, the visual sensor of the terminal device 1 collects a video picture of the corresponding user and transmits the video picture to the processor, the processor performs portrait recognition on the video picture, and portrait information of the user is obtained. Further, an effect prop corresponding to a target role selected by the user is acquired, an effect is loaded onto the portrait information according to the effect prop to obtain a first role picture of the user, and the first role picture is transmitted to a server by the transceiver. The terminal devices (the terminal device 2, . . . and the terminal device N) of other users obtain second role pictures correspondingly, and transmit the second role pictures to the server by their respective transceivers. The terminal device 1 may pull at least one second role picture transmitted by another user from the server by the transceiver, synthesize the second role picture and the first role picture by the processor, and push a synthesized picture to a display interface of the display for displaying. The method for role information interaction according to the present embodiment may enable the user to receive real-time video pictures of the other users, and provide more abundant information for the user by loading an effect onto the portrait information in the picture, such that pleasure of a game can be enhanced, and user experience can be improved. Receiving the real-time video pictures of the other users, and providing more abundant information for the user by loading the effect onto the portrait information in the picture, such that the pleasure of a game can be enhanced, and the user experience can be improved.

The technical solution of the disclosure will be described in detail below in conjunction with the specific embodiments. The following several specific embodiments can be combined with each other, and the same or similar concepts or processes may not be repeated in some embodiments.

Figure 2:
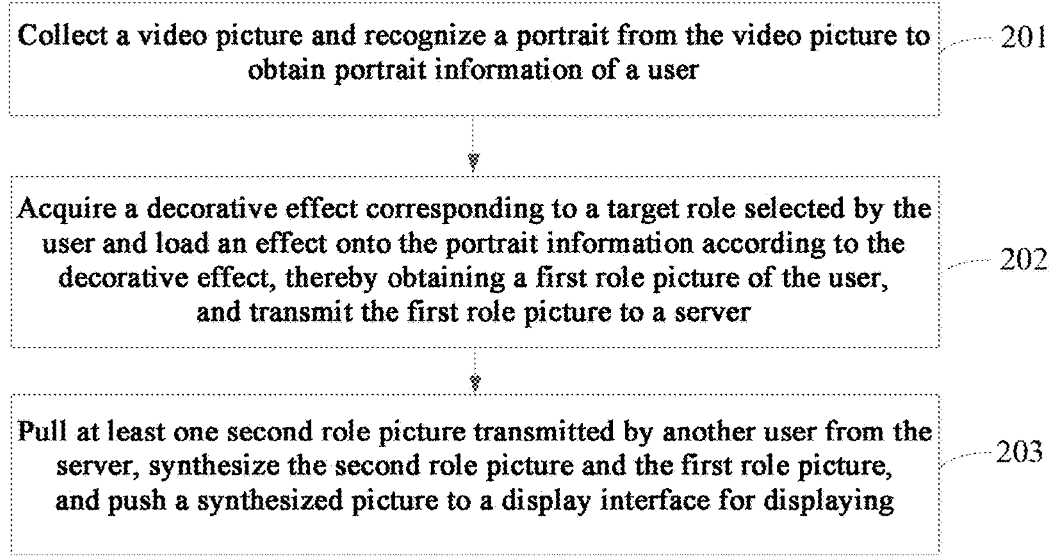
FIG. 2 is a first schematic flow diagram of a method for role information interaction according to an embodiment of the disclosure.

FIG. 2 is a first schematic flow diagram of a method for role information interaction according to an embodiment of the disclosure. The method of the embodiment may be applied to a terminal device. The method for role information interaction includes:

201, a video picture is collected and portrait recognition is performed on the video picture to obtain portrait information of a user.

Figure 7:
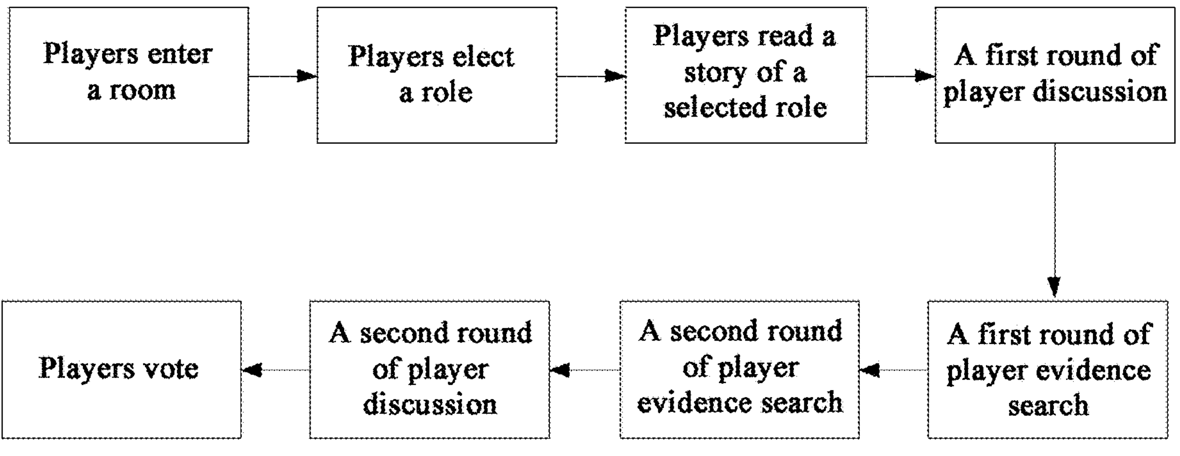
FIG. 7 is a schematic flow diagram of an online murder mystery game according to an embodiment of the disclosure.

In the embodiment, the video picture may be collected at various opportunities. The video picture may be collected when a last game session ends and players enter a discussion session, for example, when a third step of reading a story ends or a sixth step of a second round of searching for evidence ends as shown in FIG. 7. Alternatively, collection of the video picture may be triggered by the user. For example, a video collection confirmation interface may be automatically pushed to the user at the beginning of a discussion session of players, and a confirmation operation is triggered by the user through the video collection confirmation interface. For example, the confirmation operation may be a clicking operation on a confirmation control in the video collection confirmation interface. Certainly, a cancel control may also be configured in the video collection confirmation interface, such that the user may prohibit video collection through the cancel control. In order to enable the user to conveniently wake up the video collection confirmation interface at any time, a video switching control may be configured, such that the user may wake up the video collection confirmation interface again through a touch operation on the video switching control, thereby conforming to perform video collection. All the methods described above may be used, which are not limited by the embodiment.

202, an effect prop corresponding to a target role selected by the user is acquired and an effect is loaded onto the portrait information according to the effect prop, thereby a first role picture of the user is obtained, and the first role picture is transmitted to a server.

In the embodiment, the effect prop corresponding to the target role may have various types, which may include, for example, a headdress effect, a face makeup effect, a clothes effect, etc. Each type of effect may have a variety of styles. For example, hat effects in the headdress effect may have various hat styles to be selected. Certainly, any style is based on role setting. If the role is a nurse, all hat styles of the role are nurse hat styles, instead of a police hat style.

203, at least one second role picture transmitted by another user is pulled from the server, the second role picture and the first role picture are synthesized, and a synthesized picture is pushed to a display interface for displaying.

In the embodiment, if a script has N roles, then second role pictures corresponding to N−1 other roles except the own first role picture may be pulled from the server in a possible design; and the user may pull some of the N−1 second role pictures from the server according to own demand in another possible design, which is not limited by the embodiment.

From the above description, the method for role information interaction according to the embodiment includes: collecting a video picture and performing portrait recognition on the video picture, to obtain the portrait information of the user; acquiring the effect prop corresponding to the target role selected by the user and loading an effect onto the portrait information according to the effect prop to obtain the first role picture of the user, and transmitting the first role picture to the server; and pulling at least one second role picture transmitted by another user from the server, synthesizing the second role picture and the first role picture, and pushing the synthesized picture to the display interface for displaying. The method for role information interaction according to the embodiment may enable the user to receive real-time video pictures of the other users, and provide more abundant information for the user by loading an effect onto the portrait information in the picture, such that pleasure of a game can be enhanced, and user experience can be improved. Receiving the real-time video pictures of the other users, and providing more abundant information for the user by loading the effect onto the portrait information in the picture, such that the pleasure of a game can be enhanced, and the user experience can be improved.

In an embodiment of the disclosure, a method of loading an effect is described in detail in the embodiment on the basis of the embodiment shown in FIG. 2. Step 202 of the embodiment specifically includes: loading a headdress and/or face makeup onto a portrait head in the portrait information; and/or loading clothes onto a portrait trunk in the portrait information.

Figure 3:
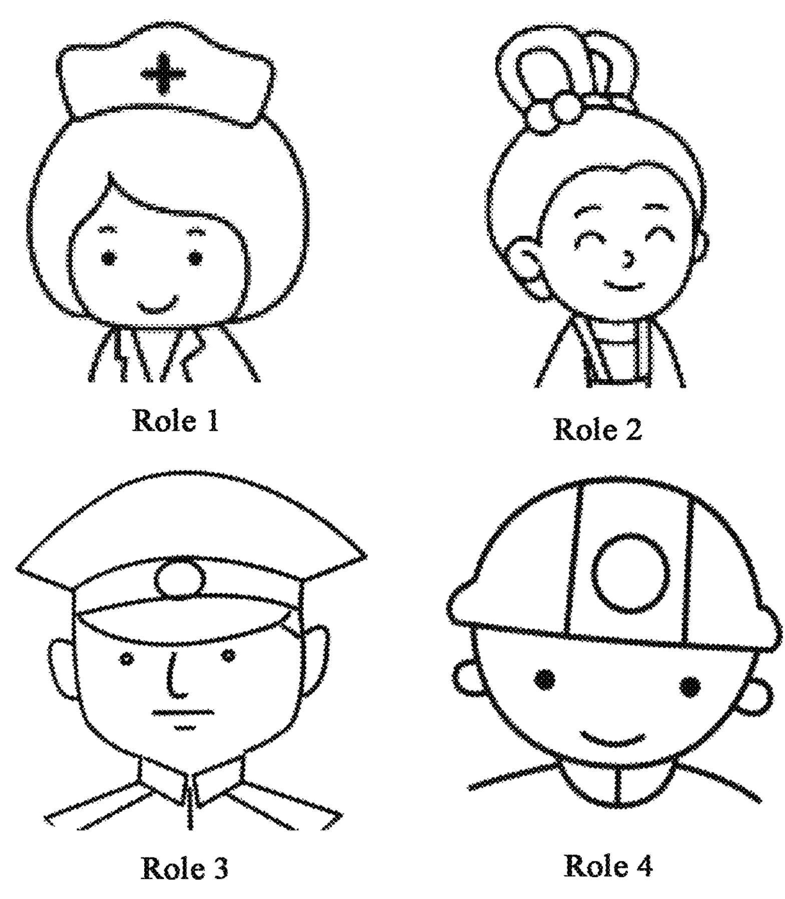
FIG. 3 is a schematic diagram of a role picture loaded with an effect according to an embodiment of the disclosure.

Specifically, as shown in FIG. 3, role 1 is a nurse, role 2 is a fairy, role 3 is a policeman, and role 4 is a worker. Accordingly, different effect props may be used for different roles. A nurse hat and corresponding work clothes may be added for the role 1. Hair accessories and corresponding fairy clothes and makeup may be added for the role 2. A police hat and a police uniform may be added for the role 3. A worker helmet may be added for the role 4.

From the above description, by adding the effect prop to the portrait information on the basis of the role, richness of the picture can be enhanced, and recognition of the role can be improved, such that the pleasure of a game can be enhanced, and the user experience can be improved.

In an embodiment of the disclosure, in order to improve a portrait processing effect, face shape correction processing before an effect loading is added in the embodiment on the basis of the embodiment shown in FIG. 3. Step 202 in the embodiment specifically includes: correcting a face shape of a face in the portrait information according to a face shape feature of the target role, to obtain portrait information having a corrected face shape. A headdress and/or face makeup is loaded onto a portrait head in the portrait information having a corrected face shape.

Figure 4:
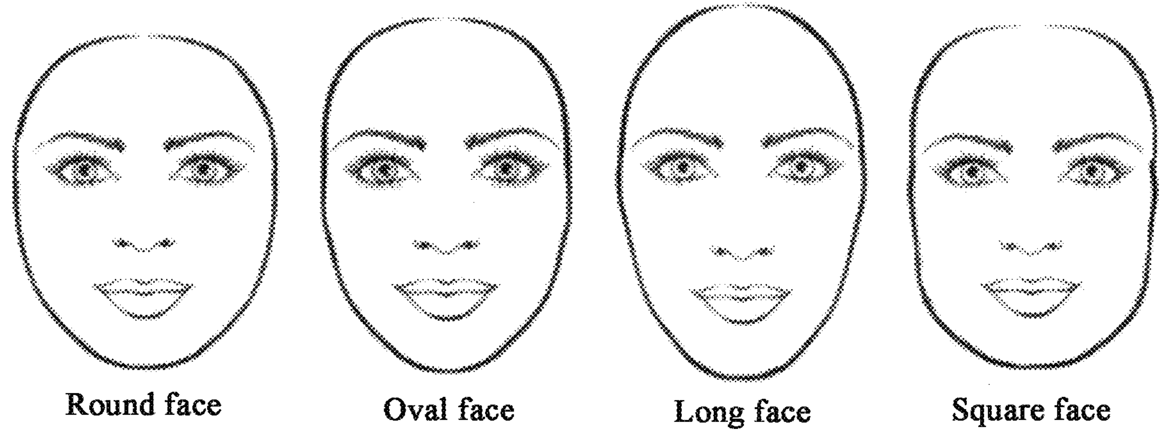
FIG. 4 is a schematic diagram of face shapes according to an embodiment of the disclosure.

Specifically, face shapes may include a round face, an oval face, a long face, and a square face as shown in FIG. 4. In order to emphasize personality traits of different roles, different face shapes are generally configured. For example, in order to emphasize fortitude of a policeman, the square face may be generally configured. If a user who selects the role has a round face or a pointed face, the face shape may be corrected and then other effect props may be added.

From the above description, by correcting the face shape of the user in the picture, the user may be closer to the role, and richness of the picture can be enhanced, such that the pleasure of a game can be enhanced, and the user experience can be improved.

Figure 5:
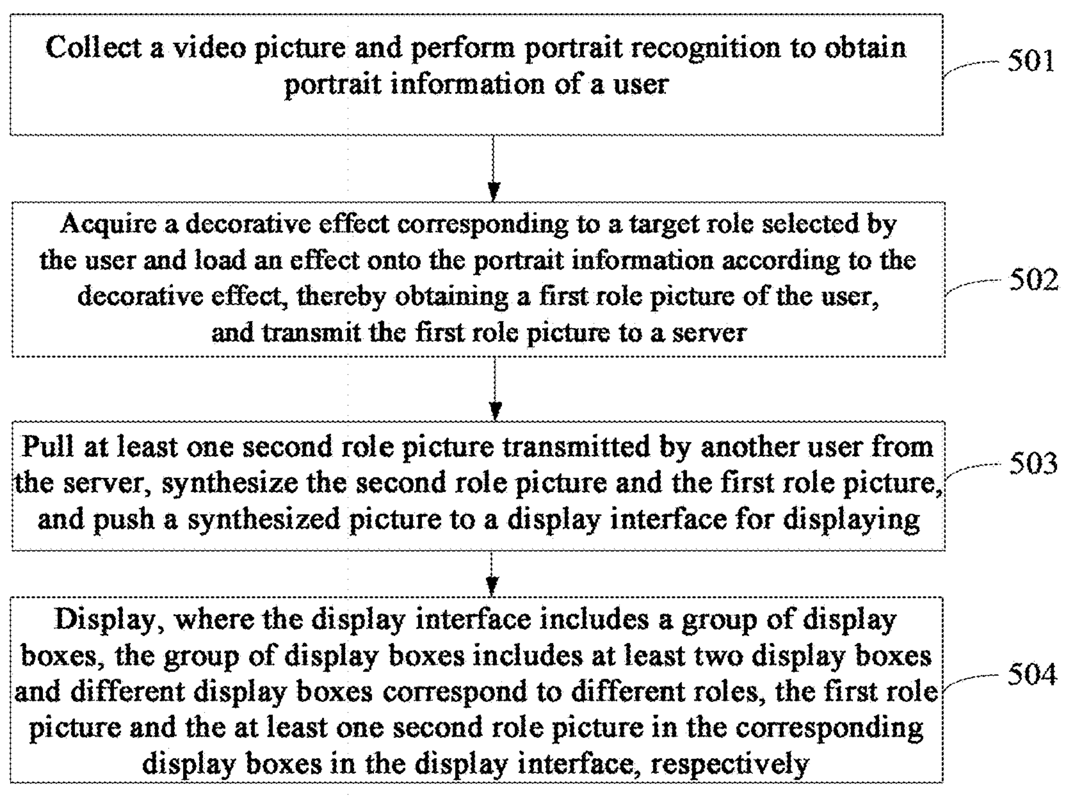
FIG. 5 is a second schematic flow diagram of a method for role information interaction according to an embodiment of the disclosure.

FIG. 5 is a second schematic flow diagram of a method for role information interaction according to an embodiment of the disclosure. In the embodiment, a method for displaying the synthesized picture in the display interface is described in detail. The method for role information interaction includes:

501, a video picture is collected and portrait recognition is performed on the video picture to obtain portrait information of a user.

502, an effect prop corresponding to a target role selected by the user is acquired and an effect is loaded onto the portrait information according to the effect prop, thereby a first role picture of the user is obtained, and the first role picture is transmitted to a server.

503, at least one second role picture transmitted by another user is pulled from the server, the second role picture and the first role picture are synthesized, and a synthesized picture is pushed to a display interface for displaying.

Steps 501 to 503 in the embodiment are similar to steps 201 to 203 in the embodiment described above, which will not be repeated herein.

504, the display interface includes a group of display boxes, the group of display boxes includes at least two display boxes, different display boxes correspond to different roles, the first role picture and the at least one second role picture are displayed in the corresponding display boxes in the display interface, respectively.

In the embodiment, the display box may have various styles, such as regular shapes, including, for example, a round box, a square box, a diamond box, etc., and irregular shapes, which is not limited in the embodiment.

Figure 6:
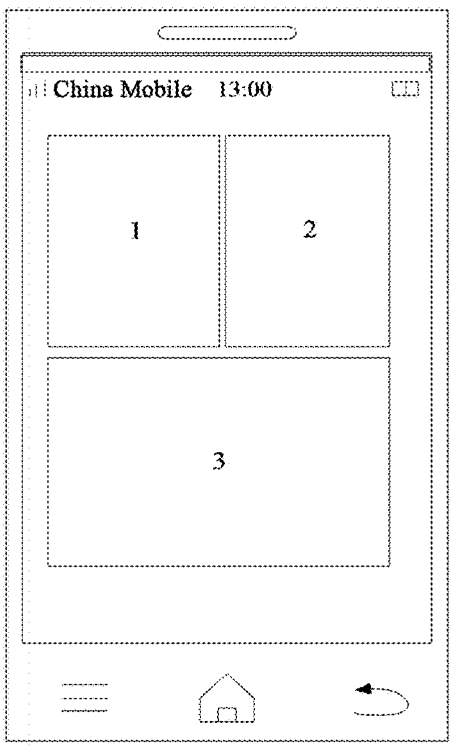
FIG. 6 is a schematic diagram of a display interface according to an embodiment of the disclosure.

In addition, a corresponding relation between each display box in the group of display boxes and each role in the script may be determined through various methods. It is assumed that all the display boxes in the group of display boxes are numbered from left to right and from top to bottom. For example, the group of display boxes in the display interface includes three display boxes as shown in FIG. 6, which are given numbers 1, 2, and 3, respectively. In a possible design, a role appearing earlier may be arranged in the display box having a smaller number according to an appearance order of the roles in the script. For example, the display box numbered 1 may be configured to play a picture corresponding to the role appearing first. In another possible design, the corresponding relation may also be determined according to importance of the roles in the script, and for example, the number of parts of the role. For example, a picture of a first leading role may be played in the display box numbered 1. The determination method is not limited by the embodiment.

In conjunction with FIG. 7, an implementation process of a method for role information interaction according to the embodiment is illustrated below with an online murder mystery game as an example.

Reference is made to FIG. 7, which is a schematic flow diagram of an online murder mystery game according to an embodiment of the disclosure. As shown in FIG. 7, when a script includes five roles for example, the game may include the following processes: step one, a player selects the script and enters a room. Step two, the player selects a role from the five roles in the script. Step three, the player reads a storyline corresponding to the selected role in the script. Step four, all the players conduct a first round of discussion, which may specifically include self-introduction in turn and reasoning discussion on the story. Step five, the player conducts a first round of evidence search. Step six, the player conducts a second round of evidence search. Step seven, all the players conduct a second round of discussion, and specifically, ask questions to a suspected role and listen to answers of the suspected role on the basis of collected clues. Step eight, the player conducts voting, and specifically voting for a suspicious role. All the players determine a murderer through voting, and the truth is announced. It may be seen from the above game process that discussion sessions of the players in step four and step seven are important sessions, in which the player finds out the real murderer through interaction with other players and story reasoning. These are also important sessions in which immersion of the player is enhanced, and pleasure of the game is reflected.

The method for role information interaction according to the embodiment may be applied in the discussion sessions of the players. For example, in a specific implementation process, a video picture is collected in response to an end instruction of a last game session or a confirmation operation triggered by the user through a video collection confirmation interface and portrait recognition is performed on the video picture, and portrait information of the user is obtained. A decorative effect (for example, a police hat and clothes) corresponding to a target role selected by the user (for example, the user selects a policeman as the target role) is acquired, an effect is loaded onto the portrait information according to the decorative effect to obtain a first role picture of the user, and the first role picture is transmitted to a server. At least one corresponding second role picture transmitted by another user is pulled from the server, the second role picture and the first role picture are synthesized, and a synthesized picture is pushed to a display interface for displaying. The display interface includes a group of display boxes, the group of display boxes includes at least two display boxes, different display boxes correspond to different roles, the first role picture and the at least one second role picture are displayed in the corresponding display boxes in the display interface, respectively. In this way, the user may know more information according to the loaded effect, and for example, may quickly know the roles selected by the other users, which can enhance pleasure of the game and improve user experience.

From the above description, different roles are assigned to different display boxes in the embodiment, such that the picture of each role may be clearly displayed, and different settings may be conveniently configured for the role pictures in different display boxes.

In an embodiment of the disclosure, a method for obtaining a group of display boxes is described in detail in the embodiment on the basis of the embodiment shown in FIG. 5. Step 504 in the embodiment described above specifically includes: the group of display boxes includes a plurality of templates, and in response to a selection operation by the user for a style template, displaying the first role picture and at least the second role picture in the template of the group of display boxes selected by the user.

Figure 8:
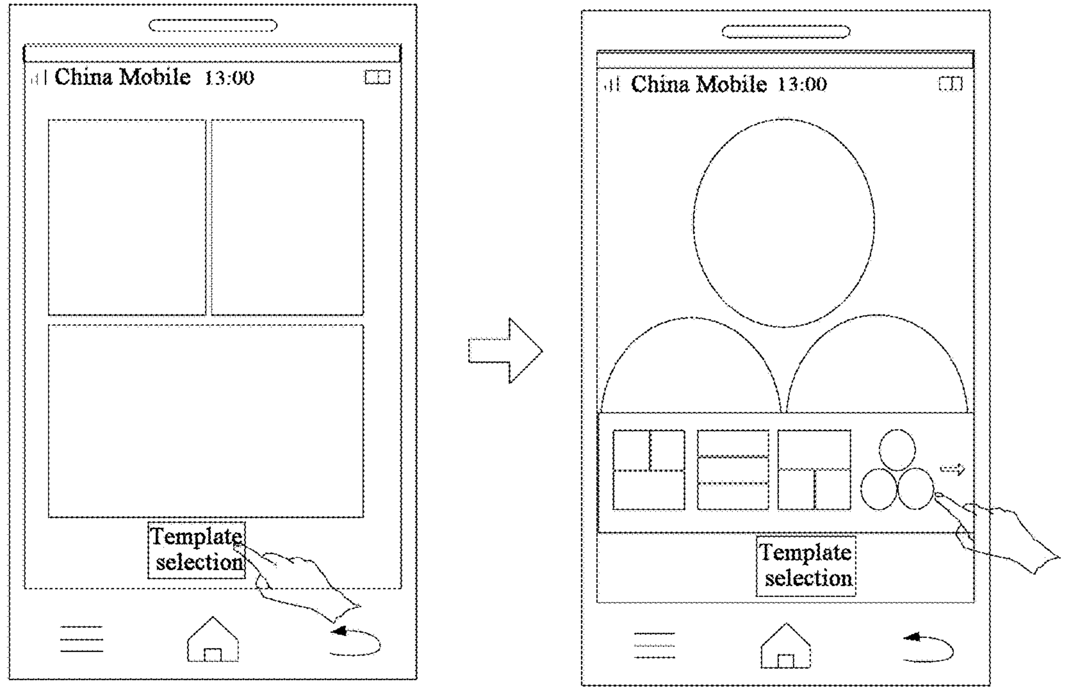
FIG. 8 is a schematic diagram of a display template list in a display interface according to an embodiment of the disclosure.

For example, as shown in FIG. 8, a template selection control may be configured in the display interface, and a template selection list may be pushed in response to a touch operation by the user on the template selection control; and in response to a selection operation for the template selection list, a current template is replaced with a selected template.

From the above description, in the embodiment, by changing a style of the group of display boxes in a template mode, the user can be provided with various choices, and operation is convenient.

In an embodiment of the disclosure, on the basis of the embodiment shown in FIG. 5 and after step 504, the method may further include: in response to a dragging operation by the user on a first target display box of the at least two display boxes, adjusting a position of the first target display box in the display interface.

In a possible implementation, the step of in response to a dragging operation by the user on a first target display box of the at least two display boxes, adjusting a position of the first target display box in the display interface, includes: in response to a dragging operation by the user from initial position coordinates of the first target display box as a start point, monitoring distance information between current position coordinates of the first target display box and position coordinates of the other display boxes, respectively; and in response to determining that the distance information is smaller than a preset value, exchanging positions of the first target display box and a display box corresponding to the distance information smaller than the preset value.

Figure 9:
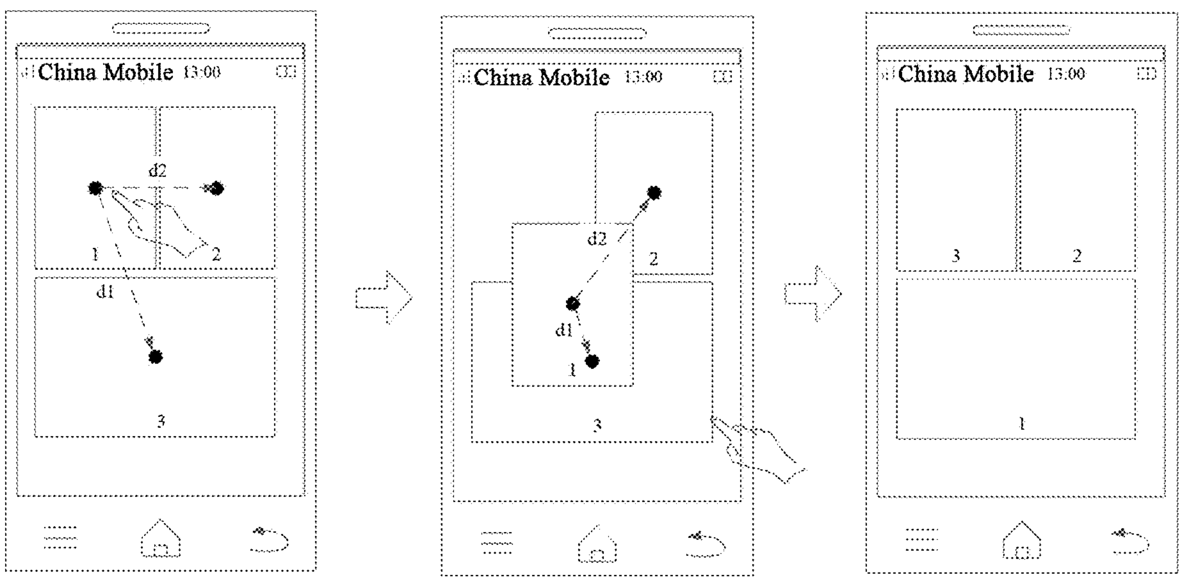
FIG. 9 is a first schematic diagram of a mode of exchanging positions of display boxes in a display interface according to an embodiment of the disclosure.

For example, as shown in FIG. 9, coordinates of a center point of the display box may be regarded as position coordinates of the display box, and a distance between position coordinates of two display boxes is regarded as a distance between the two display boxes. If display box 1 numbered 1 is dragged, a processor monitors a distance d2 between the display box 1 and display box 2 numbered 2 and a distance d1 between the display box 1 and display box 3 numbered 3. If there is a distance smaller than the preset value in d1 and d2, and for example, d1 is smaller than the preset value, positions of the display box 3 corresponding to d1 and the display box 1 are exchanged. In practical application, if two display boxes to be exchanged have the same size, the display boxes may be exchanged directly; otherwise, corresponding pictures of the two display boxes may be scaled according to a size ratio of the display boxes and then the display boxes may be exchanged.

In another possible implementation, the step of in response to a dragging operation by the user on a first target display box of the at least two display boxes, adjusting a position of the first target display box in the display interface, includes: in response to the dragging operation by the user on the first target display box of the at least two display boxes, monitoring overlapping areas of the first target display box and the other display boxes, respectively; and in response to release of the dragging operation by the user, exchanging positions of the first target display box and the display box corresponding to a maximum value of the overlapping areas.

Figure 10:
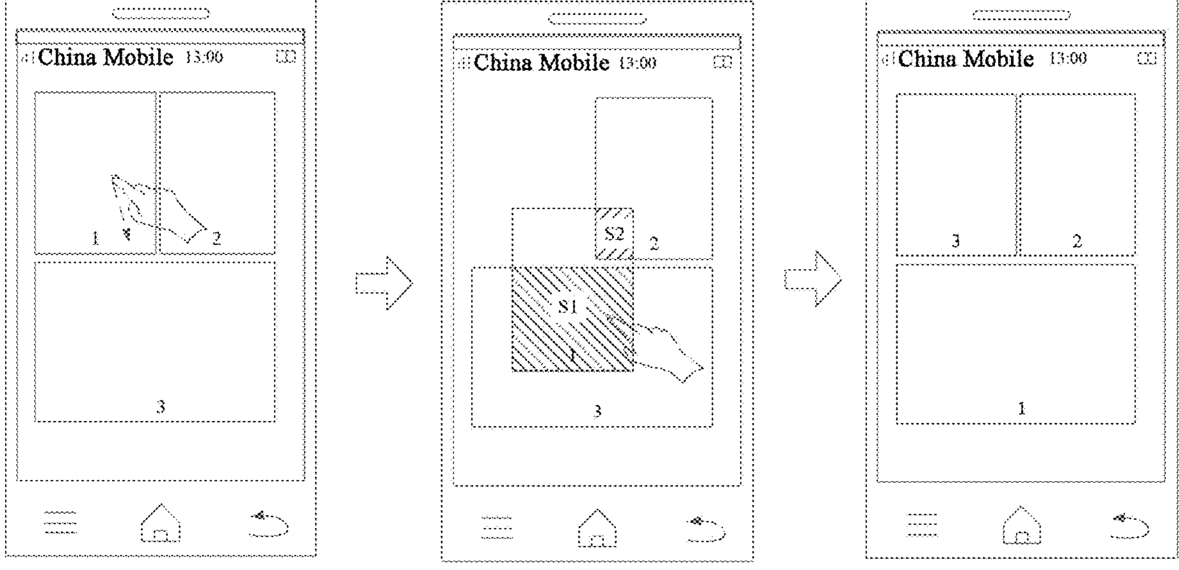
FIG. 10 is a second schematic diagram of a mode of exchanging positions of display boxes in a display interface according to an embodiment of the disclosure.

As shown in FIG. 10, if display box 1 numbered 1 is dragged, a processor monitors an overlapping area S2 between the display box 1 and display box 2 numbered 2 and an overlapping area S1 between the display box 1 and display box 3 numbered 3. When the user releases the dragging operation, a maximum value in S1 and S2 is determined, and positions of the display box corresponding to the maximum value and the display box 1 are exchanged. If S1 is greater than S2, positions of the display box 3 and the display box 1 may be exchanged. In practical application, if two display boxes to be exchanged have the same size, the display boxes may be exchanged directly; otherwise, corresponding pictures of the two display boxes may be scaled according to a size ratio of the display boxes and then the display boxes may be exchanged.

From the above description, a display order of the display boxes may be adjusted by exchanging positions of the display boxes, and if the display boxes have different sizes, the display sizes may be changed with positions of the display boxes exchanged through the pictures.

In an embodiment of the disclosure, on the basis of the embodiment shown in FIG. 5 and after step 504, the method may further include: both the first role picture and the second role picture include voice information, and monitoring voice information corresponding to each display box in the at least two display boxes; and in response to existence of a second target display box including voice information with a volume greater than a preset value, emphasizing the second target display box.

In a user discussion process, in order to avoid interference between a plurality of speakers, a speaker may be emphasized to remind the other users of the fact that someone is speaking, and it is preferable to speak later to avoid conflict.

In a possible implementation, emphasizing the second target display box includes: performing at least one of overstriking, highlighting and color changing on the second target display box; and/or adding an emphasis identifier into the second target display box.

Figure 11:
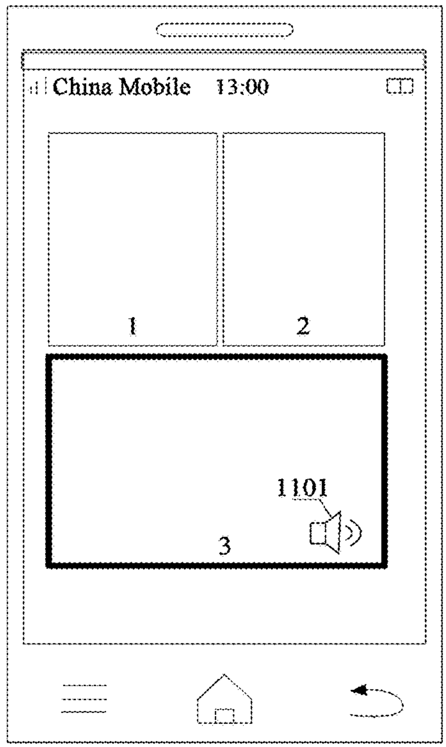
FIG. 11 is a first schematic diagram showing emphasizing on a speaker display box in a display interface according to an embodiment of the disclosure.

As shown in FIG. 11, if a role corresponding to the display box 3 is speaking, a border of the display box 3 may be made bolder, or the emphasis identifier such as a loudspeaker 1101 may be added into the display box 3. All the methods described above may be used at the same time, which are not limited by the embodiment.

In another possible implementation, the display interface includes a floating-layer display zone. The floating-layer display zone is located above the group of display boxes. emphasizing the second target display box includes: displaying a picture corresponding to the second target display box in the floating-layer display zone in a scale-up manner.

Figure 12:
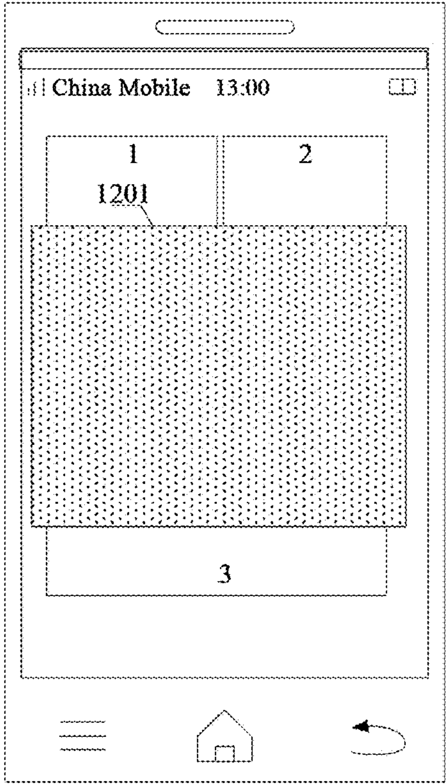
FIG. 12 is a second schematic diagram showing emphasizing on a speaker display box in a display interface according to an embodiment of the disclosure.

As shown in FIG. 12, the floating-layer display zone 1201 is located above the display boxes, and the floating-layer display zone 1201 may be displayed or closed according to user demand. A touch operation of displaying or closing may be implemented through touching of a specific control or the display interface, including, for example, tapping with two knuckles, or drawing a circle with a finger. The floating-layer display zone 1201 has a greater display area than any display box in the display group of boxes. In order to observe pictures in the other display boxes at the same time, the floating-layer display zone 1201 may be dragged and shifted in a possible design.

From the above description, a display box corresponding to a picture of a role who is currently speaking is emphasized in the embodiment, such that the other users may be reminded of temporary waiting and missing of information of the speaker is avoided.

In an embodiment of the disclosure, a closing function of the display box is added in the embodiment on the basis of the embodiment shown in FIG. 5. After step 504, the method may further include: in response to a touch operation by the user on a switch control, disabling display of a picture corresponding to a third target display box selected by user from the at least two display boxes.

Figure 13:
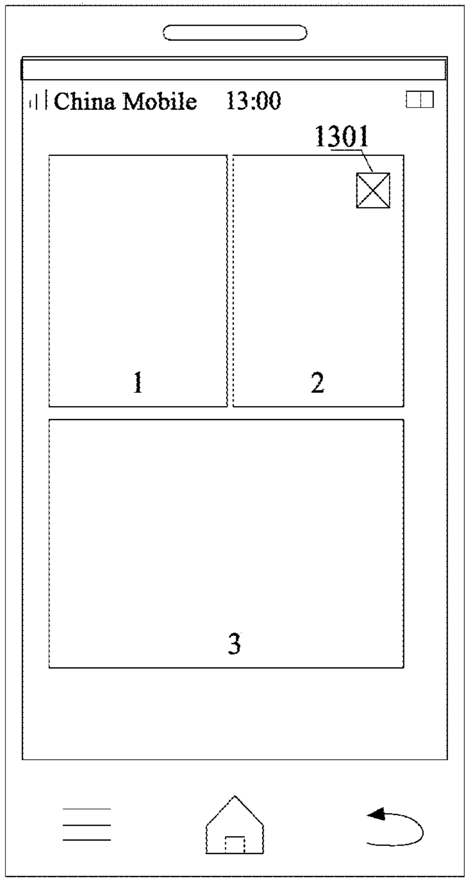
FIG. 13 is a first schematic diagram showing closing of a speaker display box in a display interface according to an embodiment of the disclosure.

As shown in FIG. 13, in a game process, if a user leaves or is online but not in a game state, display of a corresponding picture in the display box 2 may be disabled through a switch control 1301 configured in the display box 2. In this way, influence on game experience of the other users is avoided. The display box 2 may be reserved to be opened again.

In an embodiment of the disclosure, on the basis of the embodiment shown in FIG. 5 and after step 504, the method may further include: in response to a touch operation by the user on a switch control, disabling display of a picture corresponding to a third target display box selected by the user from the at least two display boxes; the display interface includes a functional zone and a picture display zone; the group of display boxes is displayed in the picture display zone; the switch control is configured in the functional zone; hiding the third target display box; computing a difference between a total area of the picture display zone and a display area of the third target display box; and re-planning each fourth target display box of the at least two display boxes except the third target display box according to the difference, such that a picture corresponding to each fourth target display box is displayed in a scale-up manner.

Figure 14:
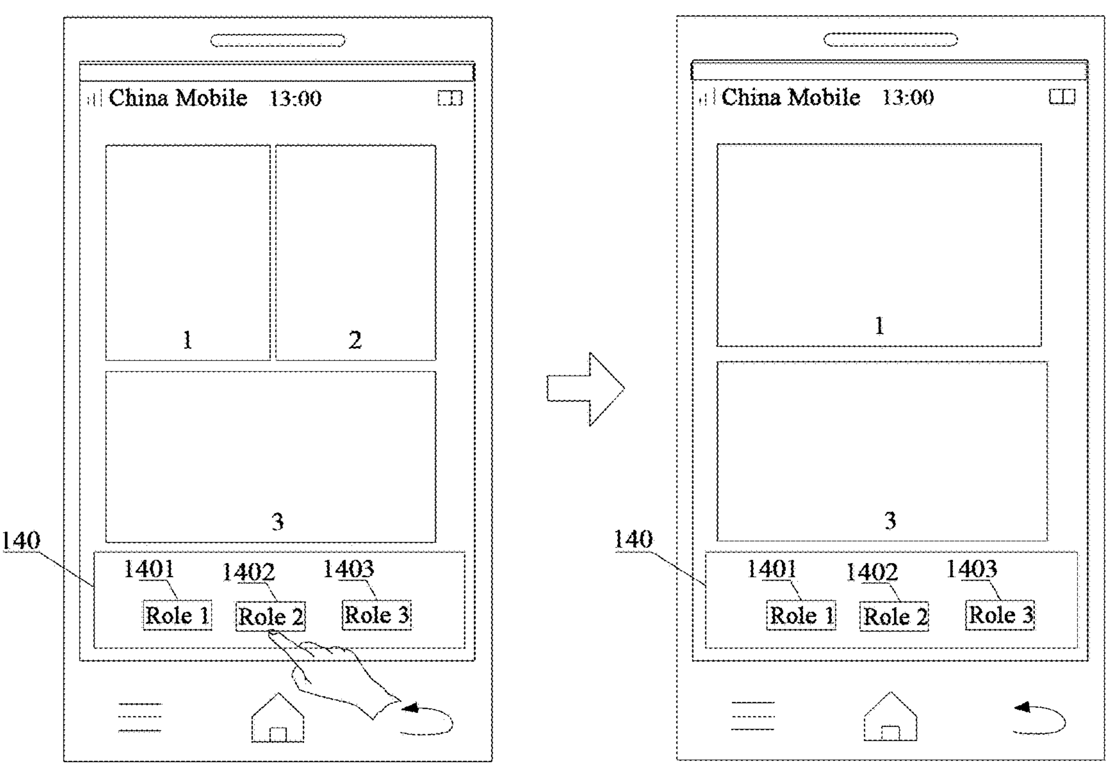
FIG. 14 is a second schematic diagram showing closing of a speaker display box in a display interface according to an embodiment of the disclosure.

As shown in FIG. 14, assuming that display box 1 displays a picture of role 1, display box 2 displays a picture of role 2, display box 3 displays a picture of role 3, and the role 2 is excluded from suspicion by users during the game. The display box 2 may be hidden through a switch control 1402 in the functional zone 140, and the remaining display boxes 1 and 2 may be re-planned, such that the display areas are increased.

From the above description, display of pictures of some roles may be conveniently disabled through configuration of the switch control in the embodiment, such that operation flexibility can be enhanced, and game experience can be improved.

In an embodiment of the disclosure, on the basis of the embodiment shown in FIG. 5 and after step 504, the method may further include: in response to a touch operation by the user on an archive control, archiving and recording a picture corresponding to a fifth target display box selected by the user from the at least two display boxes, such that an archived file is obtained.

In the embodiment, the archive control may include at least one of a video recording control, a voice recording control, and a voice-to-text control.

Figure 15:
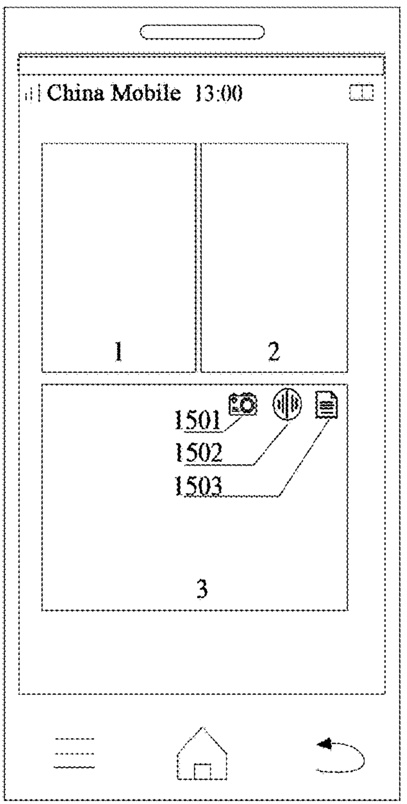
FIG. 15 is a first schematic diagram showing archiving of a corresponding picture of a display box in a display interface according to an embodiment of the disclosure.

As shown in FIG. 15, each display box may be configured with an archive control. With the display box 3 as an example, the display box 3 is configured with three types of archive controls at the same time: a video recording control 1501, a voice recording control 1502, and a voice-to-text control 1503. If a video of a picture corresponding to the display box 3 needs to be recorded, a touch operation on the video recording control 1501 may be performed, and a video archived file is obtained. If voice of a picture corresponding to the display box 3 needs to be recorded, a touch operation on the voice recording control 1502 may be performed, and a voice archived file is obtained. If a picture corresponding to the display box 3 needs to be recorded in a text form through voice-to-text, a touch operation on the voice-to-text control 1503 may be performed, and a text archived file is obtained.

In a possible implementation, after the step of in response to a touch operation by the user on an archive control, archiving and recording a picture corresponding to a fifth target display box selected by the user from the at least two display boxes, the method may further include: in response to a touch operation by the user on a playback control, playing and displaying the archived file selected by the user in the display box corresponding to the first role picture; and in response to a touch operation by the user on a region where the display box corresponding to the first role picture is located, switching the playing and displaying of the archived file to playing and displaying of the first role picture.

From the above description, the archive control according to the embodiment may enable a user to conveniently record speeches of a suspected role, obtain a corresponding archived file, and further review the file in subsequent discussion or analysis, or present the file to the other users so as to convince them. During presentations, an user may conduct playback with his/her own corresponding display box, such that observation of emotions and expressions of the other users may be not influenced. Further, the playback picture and his/her own videos may be quickly switched through the touch operation.

For terminals of the other users, evidence playback may be conducted with the corresponding display boxes of the other users, and playback pictures and their own videos may be quickly switched through the touch operation, such that real-time observation of emotions and expressions of the users except the user himself/herself is facilitated.

In an embodiment of the disclosure, on the basis of the embodiment shown in FIG. 5 and after step 504, the method may further include: the display interface includes an archiving zone and a picture display zone; the group of display boxes is displayed in the picture display zone; in response to a dragging operation by the user on the fifth target display box, monitoring position coordinates of the fifth target display box; in response to determining that current position coordinates of the fifth target display box are within a region where the archiving zone is located, displaying the fifth target display box in the archiving zone; and the archiving zone is configured to archive and record a picture corresponding to each display box in the region, and obtain the archived file.

Figure 16:
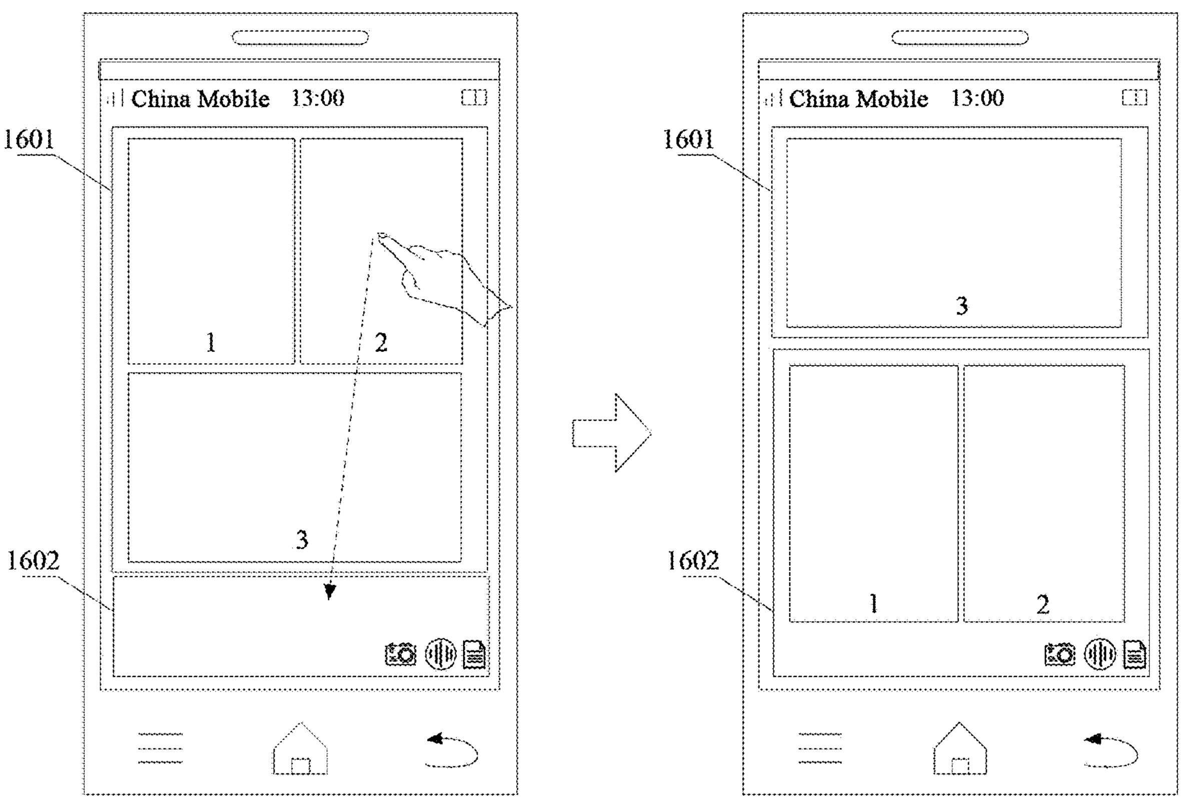
FIG. 16 is a second schematic diagram showing archiving of a corresponding picture of a display box in a display interface according to an embodiment of the disclosure.

As shown in FIG. 16, the display interface includes a picture display zone 1601 where the display box 1, the display box 2 and the display box 3 are located, and an archiving zone 1602 having an archiving function. If a user needs to archive and record pictures corresponding to one or more display boxes, the corresponding display box may be dragged from the picture display zone 1601 to the archiving zone 1602, such that an archive control does not need to be set and operated for a display box separately. As shown in FIG. 16, the user needs to archive and record the display boxes 1 and 2, and may drag the display boxes 1 and 2 into the archiving zone 1602. Alternatively, a specific archiving function may be set through the archive control in the archiving zone 1602. In the process, the display area of each display box may be adaptively re-planned, which is not limited by the embodiment.

In an embodiment of the disclosure, on the basis of the embodiment shown in FIG. 2 and before step 201, the method may further include: in response to a selection operation input by the user through a role selection interface, assigning a corresponding target role to the user; in response to a selection operation input by the user through a real-person avatar switching interface, pushing an avatar effect loading interface to the user, and displaying a real-person avatar of the user and an effect prop list corresponding to the target role in the avatar effect loading interface; in response to a selection operation by the user on the effect prop list, loading a target effect selected by the user from the effect prop list onto the real-person avatar, to obtain a customized role avatar of the user; and fusing the customized role avatar and a human body image of an animation figure corresponding to the target role in a game interface to obtain an updated game interface, and pushing the updated game interface to the user in a preset order.

Figure 17:
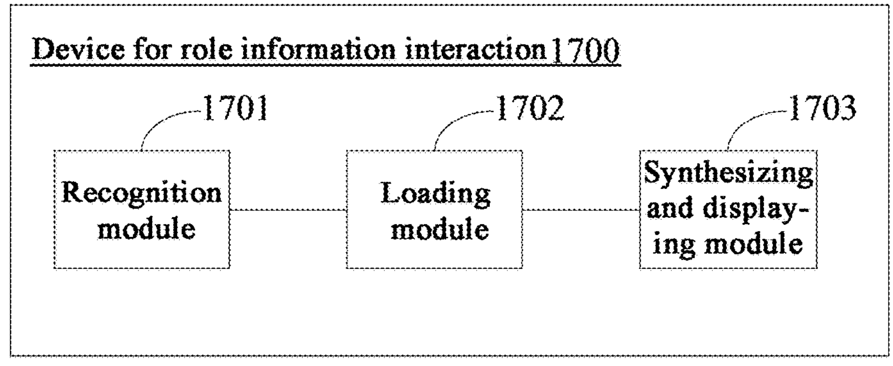
FIG. 17 is a structural block diagram of a device for role information interaction according to an embodiment of the disclosure.

Corresponding to the method for role information interaction according to the embodiments described above, FIG. 17 is a structural block diagram of a device for role information interaction according to an embodiment of the disclosure. For convenience of description, only part of content related to the embodiment of the disclosure is shown. With reference to FIG. 17, the device 1700 includes: a recognition module 1701, a loading module 1702, and a synthesizing and displaying module 1703.

The recognition module 1701 is configured to collect a video picture and perform portrait recognition on the video picture to obtain portrait information of a user.

The loading module 1702 is configured to acquire an effect prop corresponding to a target role selected by the user, load an effect onto the portrait information according to the effect prop to obtain a first role picture of the user, and transmit the first role picture to a server.

The synthesizing and displaying module 1703 is configured to pull at least one second role picture transmitted by another user from the server, synthesize the second role picture and the first role picture, and push a synthesized picture to a display interface for displaying.

In an embodiment of the disclosure, the loading module 1702 is specifically configured to load a headdress and/or face makeup onto a portrait head in the portrait information; and/or load clothes onto a portrait trunk in the portrait information.

In an embodiment of the disclosure, the loading module 1702 is specifically configured to correct a face shape of a face in the portrait information according to a face shape feature of the target role, to obtain portrait information having a corrected face shape; load a headdress and/or face makeup on a portrait head in the portrait information having a corrected face shape; and/or load clothes on a portrait trunk in the portrait information having a corrected face shape.

In an embodiment of the disclosure, the display interface includes a group of display boxes, the group of display boxes includes at least two display boxes, and different display boxes correspond to different roles. The synthesizing and displaying module 1703 is specifically configured to display the first role picture and the at least one second role picture in the corresponding display boxes in the display interface, respectively.

In an embodiment of the disclosure, the group of display boxes includes a plurality of templates. The synthesizing and displaying module 1703 is specifically configured to display, in response to a selection operation by the user for a style template, the first role picture and at least the second role picture in the template of the group of display boxes selected by the user.

In an embodiment of the disclosure, the device 1700 further includes: an adjustment module configured to adjust, in response to a dragging operation by the user on a first target display box of the at least two display boxes, a position of the first target display box in the display interface.

In an embodiment of the disclosure, the adjustment module is specifically configured to monitor, in response to a dragging operation by the user from initial position coordinates of the first target display box as a start point, distance information between current position coordinates of the first target display box and position coordinates of the other display boxes, respectively; and exchange, in response to determining that the distance information is smaller than a preset value, positions of the first target display box and a display box corresponding to the distance information smaller than the preset value.

In an embodiment of the disclosure, the adjustment module is specifically configured to monitor, in response to the dragging operation by the user on the first target display box of the at least two display boxes, overlapping areas of the first target display box and the other display boxes, respectively; and exchange, in response to release of the dragging operation by the user, positions of the first target display box and the display box corresponding to a maximum value of the overlapping areas.

In an embodiment of the disclosure, the device 1700 further includes: a emphasizing module configured to monitor voice information corresponding to each display box in the at least two display boxes; and emphasize, in response to existence of a second target display box including voice information with a volume greater than a preset value, the second target display box.

In an embodiment of the disclosure, the emphasizing module is specifically configured to perform at least one of overstriking, highlighting and color changing on the second target display box; or, add an emphasis identifier into the second target display box.

In an embodiment of the disclosure, the display interface includes a floating-layer display zone. The floating-layer display zone is located above the group of display boxes. The emphasizing module is specifically configured to display a picture corresponding to the second target display box in the floating-layer display zone in a scale-up manner.

In an embodiment of the disclosure, the device 1700 further includes: a closing module configured to disable, in response to a touch operation by the user on a switch control, display of a picture corresponding to a third target display box selected by the user from the at least two display boxes.

In an embodiment of the disclosure, the device 1700 further includes: a re-planning module configured to hide the third target display box; compute a difference between a total area of the picture display zone and a display area of the third target display box; and re-plan each fourth target display box of the at least two display boxes except the third target display box according to the difference, such that a picture corresponding to each fourth target display box is displayed in a scale-up manner.

In an embodiment of the disclosure, the device 1700 further includes: a first archiving module configured to archive and record, in response to a touch operation by the user on an archive control, a picture corresponding to a fifth target display box selected by the user from the at least two display boxes, thereby obtaining an archived file.

In an embodiment of the disclosure, the archive control includes at least one of a video recording control, a voice recording control, and a voice-to-text control.

In an embodiment of the disclosure, the device 1700 further includes: a playback module configured to play and display, in response to a touch operation by the user on a playback control, the archived file selected by the user in the display box corresponding to the first role picture.

In an embodiment of the disclosure, the device further includes: a switching module configured to switch, in response to a touch operation by the user on a region where the display box corresponding to the first role picture is located, playing and displaying of the archived file to playing and displaying of the first role picture.

In an embodiment of the disclosure, the display interface includes an archiving zone and a picture display zone. The display box group is displayed in the picture display zone. The device 1700 further includes: a second archiving module configured to monitor, in response to a dragging operation by the user on the fifth target display box, position coordinates of the fifth target display box; and display, in response to determining that current position coordinates of the fifth target display box are within a region where the archiving zone is located, the fifth target display box in the archiving zone. The archiving zone is configured to archive and record a picture corresponding to each display box in the zone, and obtain the archived file.

In an embodiment of the disclosure, the device 1700 further includes: a fusion module configured to assign, in response to a selection operation input by the user through a role selection interface, a corresponding target role to the user; push, in response to a selection operation input by the user through a real-person avatar switching interface, an avatar effect loading interface to the user, and display, in the avatar effect loading interface, a real-person avatar of the user and an effect prop list corresponding to the target role; load, in response to a selection operation by the user on the effect prop list, a target effect selected by the user from the effect prop list onto the real-person avatar, to obtain a customized role avatar of the user; and fuse the customized role avatar and a human body image of an animation figure corresponding to the target role in a game interface to obtain an updated game interface, and push the updated game interface to the user in a preset order.

The device according to the embodiment may be configured to execute the technical solutions of the method embodiments described above, and has similar implementation principle and technical effect to those of the method embodiments, which will not be repeated in the embodiment.

In order to implement the embodiments, an embodiment of the disclosure further provides an electronic device.

Figure 18:
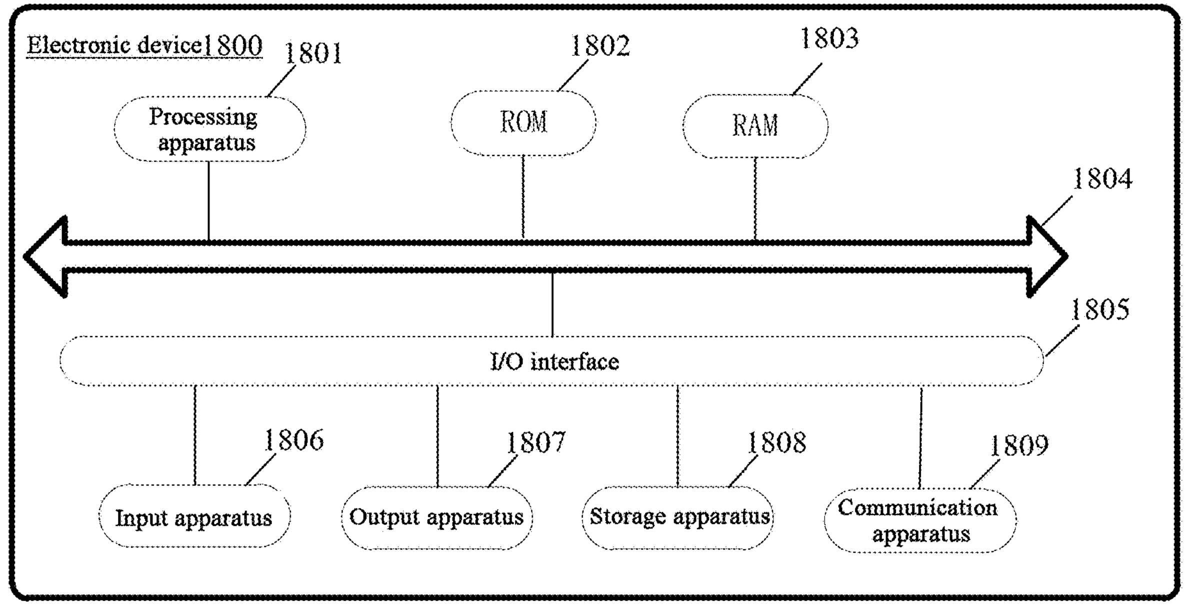
FIG. 18 is a structural block diagram of an electronic device according to an embodiment of the disclosure.

FIG. 18 shows a schematic structural diagram of an electronic device 1800 suitable for implementing the embodiment of the disclosure. The electronic device 1800 may be a terminal device. The terminal device may be, but is not limited to, a mobile terminal such as a mobile phone, a notebook computer, a digital broadcast receiver, a personal digital assistant (PDA), a portable android device (PAD), a portable media player (PMP), or a vehicle-mounted terminal (for example, a vehicle-mounted navigation terminal), and a fixed terminal such as a digital television (TV) or a desktop computer. The electronic device shown in FIG. 18 is only illustrative, and is not intended to limit functions and a use scope of the embodiments of the disclosure.

As shown in FIG. 18, the electronic device 1800 may include a processing apparatus (for example, a central processing unit or a graphics processing unit) 1801, which may execute various appropriate actions and processing according to a program stored in a read only memory (ROM) 1802 or a program loaded from a storage apparatus 1808 to a random access memory (RAM) 1803. The RAM 1803 also stores various programs and data required for operations of the electronic device 1800. The processing apparatus 1801, the ROM 1802 and the RAM 1803 are connected to one another by a bus 1804. An input/output (I/O) interface 1805 is also connected to the bus 1804.

Generally, the following apparatuses may be connected to the I/O interface 1805: an input apparatus 1806 including, for example, a touch screen, a touch pad, a keyboard, a mouse, a camera, a microphone, an accelerometer, a gyroscope, etc.; an output apparatus 1807 including, for example, a liquid crystal display (LCD), a speaker, a vibrator, etc.; the storage apparatus 1808 including, for example, a magnetic tape, a hard disk, etc.; and a communication apparatus 1809. The communication apparatus 1809 may allow the electronic device 1800 to be in wireless or wired communication with other devices for data exchange. Although FIG. 18 shows the electronic device 1800 including various apparatuses, it should be understood that not all the apparatuses shown are required to be implemented or included. More or fewer apparatuses may be alternatively implemented or included.

Particularly, according to the embodiment of the disclosure, the process described above with reference to the flow diagram may be implemented to be a computer software program. For example, an embodiment of the disclosure includes a computer program product, which includes a computer program carried by a computer-readable medium. The computer program includes a program code configured to execute the method shown in the flow diagram. In such an embodiment, the computer program may be downloaded and installed from a network through the communication apparatus 1809, or installed from the storage apparatus 1808, or installed from the ROM 1802. The computer program executes the functions defined in the method according to the embodiments of the disclosure when being executed by the processing apparatus 1801.

It should be noted that the computer-readable medium described in the disclosure may be a computer-readable signal medium, or a computer-readable storage medium, or any combination thereof. For example, the computer-readable storage medium may be, but is not limited to, an electronic, magnetic, optical, electromagnetic, infrared, or semiconductor system, apparatus, or device, or any suitable combination thereof. More specific examples of the computer-readable storage medium may include, but are not limited to, an electrical connection having on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, which may be, but is not limited to, an electromagnetic signal, an optical signal, or any suitable combination thereof. The computer-readable signal medium may further be any computer-readable medium other than the computer-readable storage medium. The computer-readable signal medium may send, propagate or transmit a program used by or in combination with an instruction execution system, apparatus or device. The program code included in the computer-readable medium may be transmitted by any suitable medium, including, but not limited to, an electric wire, an optical cable, radio frequency (RF), etc., or any suitable combination thereof.

The computer-readable medium may be included in the electronic device, or may exist independently without being assembled into the electronic device.

The computer-readable medium carries one or more programs. The one or more programs cause the electronic device to execute the method shown in the embodiments when executed by the electronic device.

A computer program code configured to execute an operation of the disclosure may be written in one or more programming languages or a combination thereof. The programming languages include object-oriented programming languages such as Java. Smalltalk, and C++, and further include conventional procedural programming languages such as "C" or similar programming languages. The program code may be executed entirely on a user computer, executed partially on a user computer, executed as a standalone software package, executed partially on a user computer and partially on a remote computer, or executed entirely on the remote computer or a server. In the case involving the remote computer, the remote computer may be connected to the user computer through any type of networks including a local area network (LAN) or a wide area network (WAN), or may be connected to an external computer (for example, connected through the Internet by an Internet service provider).

The flow diagrams and block diagrams in the accompanying drawings illustrate system structures, functions and operations, which may be achieved according to systems, methods, computer program products and computer programs in all the embodiments of the disclosure. With regard to this, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For example, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the embodiments described in the disclosure may be implemented by software or hardware. Names of the units do not limit the units themselves in some cases. For example, a first obtaining unit may also be described to be "a unit obtaining at least two Internet protocol addresses".

The functions described herein may be at least partially executed by one or more hardware logic components. For example, for the nonrestrictive purposes, illustrative types of hardware logic components that may be used include: a field-programmable gate array (FPGA), an application specific integrated circuit (ASIC), an application specific standard product (ASSP), a system on chip (SOC), a complex programmable logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof.

In a first aspect, one or more embodiments of the disclosure provide a method for role information interaction. The method includes:

obtaining portrait information of a user by collecting a video picture and performing portrait recognition on the video picture;

acquiring an effect prop corresponding to a target role selected by the user and obtaining a first role picture of the user by loading an effect onto the portrait information according to the effect prop, and transmitting the first role picture to a server; and pulling at least one second role picture transmitted by another user from the server, synthesizing the second role picture and the first role picture, and pushing a synthesized picture to a display interface for displaying.

According to one or more embodiments of the disclosure, the collecting a video picture, and obtaining portrait information of a user by performing portrait recognition on the video picture, includes:

collecting the video picture in response to an end instruction of a last game session or a confirmation operation triggered by the user through a video collection confirmation interface, and obtaining the portrait information of the user by performing portrait recognition on the video picture.

According to one or more embodiments of the disclosure, the loading an effect onto the portrait information according to the effect prop includes:

obtaining portrait information having a corrected face shape by correcting a face shape of a face in the portrait information according to a face shape feature of the target role; and loading a headdress and/or face makeup onto a portrait head in the portrait information having a corrected face shape; and/or loading clothes onto a portrait trunk in the portrait information having a corrected face shape.

According to one or more embodiments of the disclosure, the display interface includes a group of display boxes, the group of display boxes includes at least two display boxes, different display boxes correspond to different roles, and the pushing a synthesized picture to a display interface for displaying includes:

displaying the first role picture and the at least one second role picture in the corresponding display boxes in the display interface, respectively.

According to one or more embodiments of the disclosure, the group of display boxes includes a plurality of templates, and the pushing a synthesized picture to a display interface for displaying includes:

displaying, in response to a selection operation by the user for a style template, the first role picture and the at least one second role picture in the template of the display box group selected by the user.

According to one or more embodiments of the disclosure, after pushing a synthesized picture to a display interface for displaying, the method further includes:

adjusting, in response to a dragging operation by the user on a first target display box of the at least two display boxes, a position of the first target display box in the display interface.

According to one or more embodiments of the disclosure, the adjusting, in response to a dragging operation by the user on a first target display box of the at least two display boxes, a position of the first target display box in the display interface, includes:

monitoring, in response to a dragging operation by the user from initial position coordinates of the first target display box as a start point, distance information between current position coordinates of the first target display box and position coordinates of the other display boxes, respectively; and exchanging, in response to determining that the distance information is smaller than a preset value, positions of the first target display box and a display box corresponding to the distance information smaller than the preset value.

According to one or more embodiments of the disclosure, the adjusting, in response to a dragging operation by the user for a first target display box of the at least two display boxes, a position of the first target display box in the display interface, includes:

monitoring, in response to the dragging operation by the user on the first target display box of the at least two display boxes, overlapping areas of the first target display box and the other display boxes, respectively; and exchanging, in response to release of the dragging operation by the user, positions of the first target display box and the display box corresponding to a maximum value of the overlapping areas.

According to one or more embodiments of the disclosure, both the first role picture and the second role picture include voice information, and after pushing a synthesized picture to a display interface for displaying, the method further includes:

monitoring voice information corresponding to each display box of the at least two display boxes; and emphasizing, in response to existence of a second target display box including voice information with a volume greater than a preset value, the second target display box.

According to one or more embodiments of the disclosure, the emphasizing the second target display box includes:

performing at least one of overstriking, highlighting and color changing on the second target display box; or adding an emphasis identifier into the second target display box.

According to one or more embodiments of the disclosure, the display interface includes a floating-layer display zone, and the floating-layer display zone is located above the group of display boxes; and the emphasizing the second target display box includes:

displaying a picture corresponding to the second target display box in the floating-layer display zone in a scale-up manner.

According to one or more embodiments of the disclosure, after pushing a synthesized picture to a display interface for displaying, the method further includes:

disabling, in response to a touch operation by the user on a switch control, display of a picture corresponding to a third target display box selected by the user from the at least two display boxes.

According to one or more embodiments of the disclosure, the display interface includes a functional zone and a picture display zone. The group of display boxes is displayed in the picture display zone. The switch control is configured in the functional zone. After disabling display of a picture corresponding to a third target display box selected by the user from the at least two display boxes, the method further includes:

hiding the third target display box;

computing a difference between a total area of the picture display zone and a display area of the third target display box; and re-planning each fourth target display box of the at least two display boxes except the third target display box according to the difference, to display a picture corresponding to each fourth target display box in a scale-up manner.

According to one or more embodiments of the disclosure, after pushing a synthesized picture to a display interface for displaying, the method further comprises, the method further includes:

in response to a touch operation by the user on an archive control, obtaining an archived file by archiving and recording a picture corresponding to a fifth target display box selected by the user from the at least two display boxes.

According to one or more embodiments of the disclosure, the archive control includes at least one of a video recording control, a voice recording control, and a voice-to-text control.

According to one or more embodiments of the disclosure, after in response to a touch operation by the user on an archive control, the obtaining an archived file by archiving and recording a picture corresponding to a fifth target display box selected by the user from the at least two display boxes, the method further includes:

in response to a touch operation by the user on a playback control, playing and displaying the archived file selected by the user in the display box corresponding to the first role picture.

According to one or more embodiments of the disclosure, after playing and displaying the archived file selected by the user in the display box corresponding to the first role picture, the method further includes:

in response to a touch operation by the user on a zone where the display box corresponding to the first role picture is located, switching playing and displaying of the archived file to playing and displaying of the first role picture.

According to one or more embodiments of the disclosure, the display interface includes an archiving zone and a picture display zone. The display box group is displayed in the picture display zone. After pushing the synthesized picture to the display interface for displaying, the method further includes: in response to a dragging operation by the user on the fifth target display box, monitoring position coordinates of the fifth target display box; and in response to determining that current position coordinates of the fifth target display box are within a region where the archiving zone is located, displaying the fifth target display box in the archiving zone. The archiving zone is configured to archive and record a picture corresponding to each display box in the zone, thereby obtaining the archived file.

According to one or more embodiments of the disclosure, before collecting a video picture and performing portrait recognition on the video picture, the method further includes the following steps:

in response to a selection operation input by the user through a role selection interface, assigning a corresponding target role to the user;

in response to a selection operation input by the user through a real-person avatar switching interface, pushing an avatar effect loading interface to the user, and displaying a real-person avatar of the user and an effect prop list corresponding to the target role in the avatar effect loading interface;

in response to a selection operation by the user on the effect prop list, loading a target effect selected by the user from the effect prop list onto the real-person avatar, thereby obtaining a customized role avatar of the user; and fusing the customized role avatar and a human body image of an animation figure corresponding to the target role in a game interface, thereby obtaining a updated game interface, and pushing the updated game interface to the user in a preset order.

In a second aspect, one or more embodiments of the disclosure provide a device for role information interaction. The device includes: a recognition module configured to obtain portrait information of a user by collecting a video picture and performing portrait recognition on the video picture; a loading module configured to acquire an effect prop corresponding to a target role selected by the user and obtain a first role picture of the user by loading an effect onto the portrait information according to the effect prop, and transmit the first role picture to a server; and a synthesizing and displaying module configured to pull at least one second role picture transmitted by another user from the server, synthesize the second role picture and the first role picture, and push a synthesized picture to a display interface for displaying.

According to one or more embodiments of the disclosure, the recognition module is specifically configured to collect the video picture in response to an end instruction of a last game session or a confirmation operation triggered by the user through a video collection confirmation interface, and perform portrait recognition on the video picture, thereby obtaining the portrait information of the user.

According to one or more embodiments of the disclosure, the loading module is specifically configured to load a headdress and/or face makeup onto a portrait head in the portrait information; and/or load clothes onto a portrait trunk in the portrait information.

According to one or more embodiments of the disclosure, the loading module is specifically configured to correct a face shape of a face in the portrait information according to a face shape feature of the target role, thereby obtaining portrait information having a corrected face shape; load a headdress and/or face makeup on a portrait head in the portrait information having a corrected face shape; and/or load clothes on a portrait trunk in the portrait information having a corrected face shape.

According to one or more embodiments of the disclosure, the display interface includes a group of display boxes, the group of display boxes includes at least two display boxes, and different display boxes correspond to different roles. The synthesizing and displaying module is specifically configured to display the first role picture and the at least one second role picture in the corresponding display boxes in the display interface, respectively.

According to one or more embodiments of the disclosure, the group of display boxes includes a plurality of templates. The synthesizing and displaying module is specifically configured to display, in response to a selection operation by the user for a style template, the first role picture and at least the second role picture in the template of the group of display boxes selected by the user.

According to one or more embodiments of the disclosure, the device further includes: an adjustment module configured to adjust, in response to a dragging operation by the user on a first target display box of the at least two display boxes, a position of the first target display box in the display interface.

According to one or more embodiments of the disclosure, the adjustment module is specifically configured to monitor, in response to a dragging operation by the user from initial position coordinates of the first target display box, distance information between current position coordinates of the first target display box and position coordinates of the other display boxes; and exchange, in response to determining that the distance information is smaller than a preset value, positions of the first target display box and a display box corresponding to the distance information smaller than the preset value.

According to one or more embodiments of the disclosure, the adjustment module is specifically configured to monitor, in response to the dragging operation by the user on the first target display box of the at least two display boxes, overlapping areas of the first target display box and the other display boxes, respectively; and exchanging, in response to release of the dragging operation by the user, positions of the first target display box and the display box corresponding to a maximum value of the overlapping areas.

According to one or more embodiments of the disclosure, the device further includes: an emphasizing module configured to monitor voice information corresponding to each display box in the at least two display boxes; and emphasize, in response to existence of a second target display box including voice information with a volume greater than a preset value, the second target display box.

According to one or more embodiments of the disclosure, the emphasizing module is specifically configured to perform at least one of overstriking, highlighting and color changing on the second target display box; or, add an emphasis identifier into the second target display box.

According to one or more embodiments of the disclosure, the display interface includes a floating-layer display zone. The floating-layer display zone is located above the group of display boxes. The emphasizing module is specifically configured to display a picture corresponding to the second target display box in the floating-layer display zone in a scale-up manner.

According to one or more embodiments of the disclosure, the device further includes: a closing module configured to disable, in response to a touch operation by the user on a switch control, display of a picture corresponding to a third target display box selected by the user from the at least two display boxes.

According to one or more embodiments of the disclosure, the device further includes: a re-planning module configured to hide the third target display box; compute a difference between a total area of the picture display zone and a display area of the third target display box; and re-plan each fourth target display box of the at least two display boxes except the third target display box according to the difference, thereby displaying a picture corresponding to each fourth target display box in a scale-up manner.

According to one or more embodiments of the disclosure, the device further includes: a first archiving module configured to archive and record, in response to a touch operation by the user on an archive control, a picture corresponding to a fifth target display box selected by the user from the at least two display boxes, thereby obtaining an archived file.

According to one or more embodiments of the disclosure, the archive control includes at least one of a video recording control, a voice recording control, and a voice-to-text control.

According to one or more embodiments of the disclosure, the device further includes: a playback module configured to play and display, in response to a touch operation by the user on a playback control, the archived file selected by the user in the display box corresponding to the first role picture.

According to one or more embodiments of the disclosure, the device further includes a switching module configured to switch, in response to a touch operation by the user on a zone where the display box corresponding to the first role picture is located, playing and displaying of the archived file to playing and displaying of the first role picture.

According to one or more embodiments of the disclosure, the display interface includes an archiving zone and a picture display zone. The display box group is displayed in the picture display zone. The device further includes: a second archiving module configured to monitor, in response to a dragging operation by the user on the fifth target display box, position coordinates of the fifth target display box; and display, in response to determining that current position coordinates of the fifth target display box are within a region where the archiving zone is located, the fifth target display box in the archiving zone. The archiving zone is configured to archive and record a picture corresponding to each display box in the zone, thereby obtaining the archived file.

According to one or more embodiments of the disclosure, the device further includes: a fusion module configured to assign, in response to a selection operation input by the user through a role selection interface, a corresponding target role to the user, push, in response to a selection operation input by the user through a real-person avatar switching interface, an avatar effect loading interface to the user, and display a real-person avatar of the user and an effect prop list corresponding to the target role in the avatar effect loading interface; load, in response to a selection operation by the user on the effect prop list, a target effect selected by the user from the effect prop list onto the real-person avatar, thereby obtaining a customized role avatar of the user; and fuse the customized role avatar and a human body image of an animation figure corresponding to the target role in a game interface, thereby obtaining an updated game interface, and push the updated game interface to the user in a preset order.

In a third aspect, one or more embodiments of the disclosure provide an electronic device. The electronic device includes: a visual sensor, a processor, a memory, a display, and a transceiver.

The visual sensor, the processor, the memory, the display and the transceiver are interconnected to each other by a circuit.

The memory stores a computer-executable instruction. The visual sensor is configured to collect a video picture. The transceiver is configured to transmit data to and receive data from a server. The display is configured to display a synthesized picture.

The processor executes the computer-executable instruction stored in the memory, causing the processor to execute the method for role information interaction according to the first aspect and various possible designs of the first aspect.

In a fourth aspect, one or more embodiments of the disclosure provide a computer-readable storage medium. The computer-readable storage medium stores a computer-executable instruction. A processor implements the method for role information interaction according to the first aspect and various possible designs of the first aspect when executing the computer-executable instruction.

In a fifth aspect, one or more embodiments of the disclosure provide a computer program product. The computer program product includes a computer program. The computer program implements the method for role information interaction according to the first aspect and various possible designs of the first aspect when executed by a processor.

In a sixth aspect, one or more embodiments of the disclosure provide a computer program. The computer program implements the method for role information interaction according to the first aspect and various possible designs of the first aspect when executed by a processor.

What are described above are merely illustrative of preferred embodiments of the disclosure and principles of the technology employed. Those skilled in the art should understand that the disclosure scope of the disclosure is not limited to the technical solution formed by a specific combination of the technical features described above, and should further cover other technical solutions formed by any combination of the technical features described above or their equivalent features without departing from the disclosed concept, for example, the technical solution formed by replacing the features with the (non-limitative) technical features having similar functions disclosed in the disclosure or vice versa.

Further, although operations are depicted in a particular order, it should be understood that the operations are not required to be executed in the particular order shown or in a sequential order. In some cases, multitasking and parallel processing may be advantageous. Likewise, although several specific implementation details are included in the above discussion, the details should not be construed as limiting the scope of the disclosure. Some features described in the context of separate embodiments may also be implemented in combination in a single embodiment. On the contrary, various features described in the context of a single embodiment may also be implemented in a plurality of embodiments independently or in any suitable sub-combination manner.

Although the subject is described in languages of specific structural features and/or methodological logic actions, it should be understood that the subject defined in the appended claims is not necessarily limited to the specific features or actions described above. On the contrary, the specific features and actions described above are merely illustrative forms for implementing the claims.

We claim:

1. A method for role information interaction, comprising:

obtaining portrait information of a user by collecting a video picture and performing portrait recognition on the video picture;

acquiring an effect corresponding to a first role selected by the user and obtaining a first role picture of the user by loading the effect onto the portrait information, and transmitting the first role picture to a server;

pulling at least one second role picture from the server, synthesizing the second role picture and the first role picture, and displaying a synthesized picture on a display interface, wherein the display interface comprises a plurality of display boxes, different display boxes correspond to different roles, and the pushing the synthesized picture to the display interface for displaying comprises displaying the first role picture and the at least one second role picture in corresponding display boxes on the display interface; and disabling, in response to a touch operation by the user on a switch control, display of a picture corresponding to a display box selected by the user from the plurality of display boxes.

2. The method according to claim 1, wherein the obtaining portrait information of a user by collecting a video picture and performing portrait recognition on the video picture, comprises:

obtaining the portrait information of the user by collecting the video picture in response to an end instruction of a last game session or a confirmation operation triggered by the user through a video collection confirmation interface and performing portrait recognition on the video picture.

3. The method according to claim 1, wherein the loading an effect onto the portrait information according to the effect comprises:

obtaining portrait information having a corrected face shape by correcting a face shape of a face in the portrait information according to a face shape feature of the first role; and loading a headdress and/or face makeup onto a portrait head in the portrait information having a corrected face shape; and/or loading clothes onto a portrait trunk in the portrait information having a corrected face shape.

4. The method according to claim 1, wherein the plurality of display boxes comprises a plurality of templates, and the pushing the synthesized picture to the display interface for displaying comprises:

displaying, in response to a selection operation by the user for a style template, the first role picture and the at least one second role picture in the template of selected by the user.

5. The method according to claim 1, wherein after the pushing the synthesized picture to the display interface for displaying, the method further comprises:

adjusting, in response to a dragging operation by the user on a first display box of the plurality of display boxes, a position of the first display box in the display interface.

6. The method according to claim 5, wherein the adjusting, in response to a dragging operation by the user on a first display box of the plurality of display boxes, a position of the first display box in the display interface, comprises:

monitoring, in response to a dragging operation by the user from initial position coordinates of the first display box as a start point, distance information between current position coordinates of the first display box and position coordinates of the other display boxes, respectively; and exchanging, in response to determining that the distance information is smaller than a preset value, positions of the first target display box and a display box corresponding to the distance information smaller than the preset value.

7. The method according to claim 5, wherein the adjusting, in response to a dragging operation by the user for a first display box of the plurality of display boxes, a position of the first display box in the display interface, comprises:

monitoring, in response to the dragging operation by the user on the first display box of the plurality of display boxes, overlapping areas of the first display box and the other display boxes, respectively; and exchanging, in response to release of the dragging operation by the user, positions of the first display box and the display box corresponding to a maximum value of the overlapping areas.

8. The method according to claim 1, wherein both the first role picture and the at least one second role picture comprise voice information, and after the pushing the synthesized picture to the display interface for displaying, the method further comprises:

monitoring voice information corresponding to each display box of the plurality of display boxes; and emphasizing, in response to existence of a second display box including voice information with a volume greater than a preset value, the second display box.

9. The method according to claim 8, wherein the emphasizing the second display box comprises:

performing at least one of bolding, highlighting and color changing on the second display box; or adding an emphasis identifier into the second display box.

10. The method according to claim 8, wherein the display interface comprises a floating-layer display zone, and the floating-layer display zone is located above the plurality of display boxes; and the emphasizing the second display box comprises:

displaying a picture corresponding to the second target display box in the floating-layer display zone in a scale-up manner.

11. The method according to claim 1, wherein the display interface comprises a functional zone and a picture display zone; the plurality of display boxes is displayed in the picture display zone; the switch control is configured in the functional zone; and after the disabling display of the picture corresponding to a third display box selected by the user from the plurality of display boxes, the method further comprises:

hiding the third display box;

computing a difference between a total area of the picture display zone and a display area of the third display box; and re-planning each fourth display box of the plurality of display boxes except the third display box according to the difference, to display a picture corresponding to each fourth display box in a scale-up manner.

12. The method according to claim 1, wherein before the collecting a video picture and performing portrait recognition on the video picture, the method further comprises:

assigning, in response to a selection operation input by the user through a role selection interface, a corresponding first role to the user;

pushing, in response to a selection operation input by the user through a real-person avatar switching interface, an avatar effect loading interface to the user, and displaying a real-person avatar of the user and an effect list corresponding to the first role in the avatar effect loading interface;

obtaining a customized role avatar of the user by loading, in response to a selection operation by the user on the effect list, an effect selected by the user from the effect list onto the real-person avatar; and obtaining an updated game interface by fusing the customized role avatar and a human body image of an animation figure corresponding to the first role in a game interface, and pushing the updated game interface to the user in a preset order.

13. An electronic device, comprising: a visual sensor, a processor, a memory, a display, and a transceiver, wherein the visual sensor, the processor, the memory, the display and the transceiver are interconnected to each other by a circuit;

the memory stores a computer-executable instruction; the visual sensor is configured to collect a video picture; the transceiver is configured to transmit data to and receive data from a server; the display is configured to display a synthesized picture; and the computer-executable instruction stored in the memory, when executed by the processor, causes the processor to perform operations comprising:

obtaining portrait information of a user by collecting a video picture and performing portrait recognition on the video picture;

acquiring an effect corresponding to a first role selected by the user and obtain a first role picture of the user by loading the effect onto the portrait information, and transmitting the first role picture to a server;

pulling at least one second role picture transmitted by another user from the server, synthesize the second role picture and the first role picture, and displaying a synthesized picture on a display interface, wherein the display interface comprises a plurality of display boxes, different display boxes correspond to different roles, and the pushing the synthesized picture to the display interface for displaying comprises displaying the first role picture and the at least one second role picture in corresponding display boxes on the display interface; and disabling, in response to a touch operation by the user on a switch control, display of a picture corresponding to a display box selected by the user from the plurality of display boxes.

14. A non-transitory computer-readable storage medium, wherein the computer-readable storage medium stores a computer-executable instruction, the computer-executable instruction, when executed by a processor, causes the processor to perform operations comprising:

obtaining portrait information of a user by collecting a video picture and performing portrait recognition on the video picture;

acquiring an effect corresponding to a first role selected by the user and obtaining a first role picture of the user by loading the effect onto the portrait information, and transmitting the first role picture to a server;

pulling at least one second role picture from the server, synthesize the second role picture and the first role picture, and displaying a synthesized picture on a display interface, wherein the display interface comprises a plurality of display boxes, different display boxes correspond to different roles, and the pushing the synthesized picture to the display interface for displaying comprises displaying the first role picture and the at least one second role picture in corresponding display boxes on the display interface; and disabling, in response to a touch operation by the user on a switch control, display of a picture corresponding to a display box selected by the user from the plurality of display boxes.

15. The electronic device according to claim 13, wherein when the obtaining portrait information of a user by collecting a video picture and performing portrait recognition on the video picture comprises:

obtaining the portrait information of the user by collecting the video picture in response to an end instruction of a last game session or a confirmation operation triggered by the user through a video collection confirmation interface and performing portrait recognition on the video picture.

16. The electronic device according to claim 13, wherein when the loading an effect onto the portrait information according to the effect comprises:

obtaining portrait information having a corrected face shape by correcting a face shape of a face in the portrait information according to a face shape feature of the first role; and loading a headdress and/or face makeup onto a portrait head in the portrait information having a corrected face shape; and/or load clothes onto a portrait trunk in the portrait information having a corrected face shape.

17. The electronic device according to claim 13, wherein the plurality of display boxes comprises a plurality of templates, and the pushing the synthesized picture to the display interface for displaying comprises:

displaying, in response to a selection operation by the user for a style template, the first role picture and the at least one second role picture in the template selected by the user.

18. The electronic device according to claim 13, the operations further comprising:

adjusting, in response to a dragging operation by the user on a first display box among the plurality of display boxes, a position of the first display box on the display interface.

19. The electronic device according to claim 13, wherein both the first role picture and the at least one second role picture comprise voice information, and the operations further comprise:

monitoring voice information corresponding to each display box of the plurality of display boxes; and emphasizing, in response to existence of a second display box including voice information with a volume greater than a preset value, the second display box.

20. The electronic device according to claim 13, wherein the display interface comprises a functional zone and a picture display zone; the plurality of display boxes is displayed in the picture display zone; the switch control is configured in the functional zone; and after the disabling display of the picture, the operations further comprise:

hiding a third display box among the plurality of display boxes;

computing a difference between a total area of the picture display zone and a display area of the third display box; and re-planning each fourth display box of the plurality of display boxes except the third display box according to the difference, to display a picture corresponding to each fourth display box in a scale-up manner.

* * * * *